(12) United States Patent
Wlodarczyk et al.

(10) Patent No.: US 11,156,740 B2
(45) Date of Patent: Oct. 26, 2021

(54) ELECTROFACIES DETERMINATION

(71) Applicant: Schlumberger Technology Corporation, Sugar Land, TX (US)

(72) Inventors: Sylvain Wlodarczyk, Saint Clement de Riviere (FR); Vianney Bruned, Grabels (FR); Florent D'Halluin, Grabels (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 437 days.

(21) Appl. No.: 15/778,212

(22) PCT Filed: Dec. 7, 2016

(86) PCT No.: PCT/US2016/065236
§ 371 (c)(1),
(2) Date: May 22, 2018

(87) PCT Pub. No.: WO2017/100228
PCT Pub. Date: Jun. 15, 2017

(65) Prior Publication Data
US 2018/0348398 A1    Dec. 6, 2018

(30) Foreign Application Priority Data

Dec. 9, 2015 (FR) ........................... 1562075
Dec. 9, 2015 (FR) ........................... 1562079

(51) Int. Cl.
*G01V 11/00*    (2006.01)
*G01V 1/48*    (2006.01)

(52) U.S. Cl.
CPC .............. *G01V 11/00* (2013.01); *G01V 1/48* (2013.01); *G01V 2210/6167* (2013.01);
(Continued)

(58) Field of Classification Search
CPC .... G01V 11/00; G01V 1/48; G01V 2210/643; G01V 2210/66; G01V 2210/6169; G01V 2210/6167
See application file for complete search history.

(56) References Cited

U.S. PATENT DOCUMENTS 4,646,240 A * 2/1987 Serra .................... G01V 11/002
                                                                324/323
6,052,651 A * 4/2000 Fournier .............. G06K 9/6253
                                                                702/14
(Continued)

FOREIGN PATENT DOCUMENTS

CN    103336305 A    10/2013
EP    2113796 A1    11/2009
(Continued)

OTHER PUBLICATIONS

International Preliminary Report on Patentability for the equivalent International patent application PCT/US2016/065236 dated Jun. 21, 2018.
(Continued)

*Primary Examiner* — Stephanie E Bloss

(57) ABSTRACT

A method for includes obtaining a well log comprising a sequence of measurements of a wellbore in a field, and generating change points in the well log based on the sequence of measurements. Each of the change points corresponds to a depth along the wellbore where a probability distribution of the well log changes. The method further includes generating a statistic for each of multiple intervals in the well log, where the intervals are defined by the plurality of change points, categorizing the intervals based on the statistic for each of the intervals to generate categorized intervals, and performing the operation based on the categorized intervals.

15 Claims, 12 Drawing Sheets

(52) U.S. Cl.
CPC ............... *G01V 2210/6169* (2013.01); *G01V 2210/643* (2013.01); *G01V 2210/66* (2013.01)

(56) References Cited

U.S. PATENT DOCUMENTS

| | | | | |
|---|---|---|---|---|
| 6,295,504 | B1* | 9/2001 | Ye | G06K 9/622 |
| | | | | 702/7 |
| 2002/0091489 | A1* | 7/2002 | Ye | G01V 3/38 |
| | | | | 702/6 |
| 2008/0162093 | A1* | 7/2008 | Nivlet | G01V 1/30 |
| | | | | 703/2 |
| 2008/0162098 | A1 | 7/2008 | Suarez-Rivera et al. | |
| 2013/0144532 | A1 | 2/2013 | Williams | |
| 2013/0096835 | A1 | 4/2013 | Chok et al. | |
| 2013/0116925 | A1 | 5/2013 | Hruska et al. | |
| 2013/0124092 | A1 | 5/2013 | Thorne | |
| 2013/0179081 | A1 | 7/2013 | Bartetzko et al. | |
| 2013/0297272 | A1 | 11/2013 | Sung et al. | |
| 2013/0325350 | A1 | 12/2013 | Thorne | |
| 2014/0098635 | A1 | 4/2014 | Lin | |
| 2015/0039235 | A1 | 2/2015 | Wiener et al. | |
| 2015/0088424 | A1* | 3/2015 | Burlakov | G01V 99/00 |
| | | | | 702/6 |
| 2015/0378042 | A1* | 12/2015 | Snow | G01V 1/50 |
| | | | | 367/26 |
| 2018/0238148 | A1* | 8/2018 | Canady | G06F 17/10 |
| 2020/0183042 | A1 | 6/2020 | Amidi et al. | |

FOREIGN PATENT DOCUMENTS

| | | |
|---|---|---|
| GB | 2463242 B | 11/2012 |
| WO | 2017100228 A1 | 6/2017 |

OTHER PUBLICATIONS

Charrad, et al., "NbClust: An R Package for Determining the Relevant Number of Clusters in a Data Set," Journal of Statistical Software, vol. 61, Issue 6, pp. 1-36, 2014.
Euzen, et al., "Well Log Cluster Analysis: An Innovative Tool for Unconventional Exploration," Canadian Unconventional Resources and International Petroleum Engineers, 2010.
Killick, et al., "Optimal detection of changepoints with a linear computational cost," Journal of the American Statistical Association 107(500) pp. 1590-1598, 2012.
Kohonen, "The self-organizing map," Proceedings of the IEEE, 78(9), pp. 1464-1480, 1990.
Ng, et al., "On spectral clustering: Analysis and an algorithm," Advances in Neural Information Processing Systems, vol. 2, pp. 849-856, 2002.
Rebelle, "Rock-typing in Carbonates: A Critical Review of Clustering Methods," Society of Petroleum Engineers, Nov. 10, 2014.
Scott, et al., "A cluster analysis method for grouping means in the analysis of variance," Biometrics, vol. 30, No. 3, pp. 507-512, 1974.
Spielman, et al., "Spectral partitioning works: Planar graphs and finite element meshes," Linear Algebra and its Applications, 421(2), pp. 284-305, 2007.
Wolf, et al., "Faciolog—Automatic Electrofacies Determination," Society of Petrophysicists and Well-Log Analysts. Jan. 1, 1982.
Ye, et al., "A New Tool for Electro-Facies Analysis: Multi-Resolution Graph-Based Clustering," Society of Petrophysicists and Well-Log Analysts, Jan. 1, 2000.
International Search Report and Written Opinion for the equivalent International patent application PCT/US2016/065236 dated Apr. 18, 2017.
Anonymous, "Depth Constrained Cluster Analysis Description," Feb. 1, 1998, retrieved from the Internet at http://www.kgs.ku.edu/stratigraphic/ZONATION/description.html.
Igbokwe, "Stratigraphic Interpretation of Well-Log data of the Athabasca Oil Sands Alberta Canada through Pattern recognition and Artificial Intelligence," Final Thesis of Master in Geospatial Technologies, Feb. 25, 2011, pp. 1-83.
Sun, "Statistical Rock Physics—Introduction Book review 3.1-3.3,"Mar. 13, 2009, retrieved from the Internet at http://www.rpl.uh.edu/pdf/minsun_stats.pdf.
Surek, "Cluster Analysis of the Balakhany VIII Reservoir Unit with Spectral Gamma Ray Logs Azeri-Chirag-Gunashli Field, Offshore Azerbaijan," Thesis of the Faculty of the Department of Earth and Atmospheric Sciences University of Houston, Dec. 1, 2013, pp. 1-90.
Extended Search Report for the equivalent European patent application 16873699.9 dated Jul. 18, 2019.
Communication pursuant to Article 94(3) EPC dated Nov. 20, 2020 for equivalent European Patent Application No. 16873699.9, 13 pages.
Xuanzhi and Nyland "Automated Stratigraphic Interpretation of well-log data", Geophysics vol. 52, No. 12, Dec. 1987, p. 1665-1676, 14 Figs.
Ankerst, et al., "OPTICS: Ordering Points to Identify the Clustering Structure," Proceedings ACM SIGMOD '99 International Conference on Management of Data, Philadelphia PA. 1999.
Bengio et al., "Label Propagation and Quadratic Criterion," MIT Press. 2006, pp. 35-58.
Patwary et al., "Scalable Parallel Optics Data Clustering Using Graph Algorithmic Techniques," The International Conference for High Performance Computing, Networking, Storage and Analysis, Nov. 2013, vol. 49, pp. 1-12.
Thomsen, "Weak elastic anisotropy", Geophysics, vol. 51, No. 10, pp. 1954-1966, Oct. 1986.
Wilson, "Volume of n-dimensional ellipsoid," Sciencia Acta Xaveriana, Dec. 13, 2009, vol. 1, No. 1, pp. 101-106.
Search Report and Written Opinion of International Patent Application No. PCT/US2018/033772 dated Sep. 14, 2018, 11 pages.
Search Report for the French Patent Application 1562075 dated Apr. 2, 2016.
International Preliminary Report on Patentability of International Patent Application No. PCT/US2018/033772 dated Nov. 26, 2019, 8 pages.
Extended Search Report for European Patent Application No. 18806662.5 dated Jan. 18, 2021, 8 pages.

\* cited by examiner

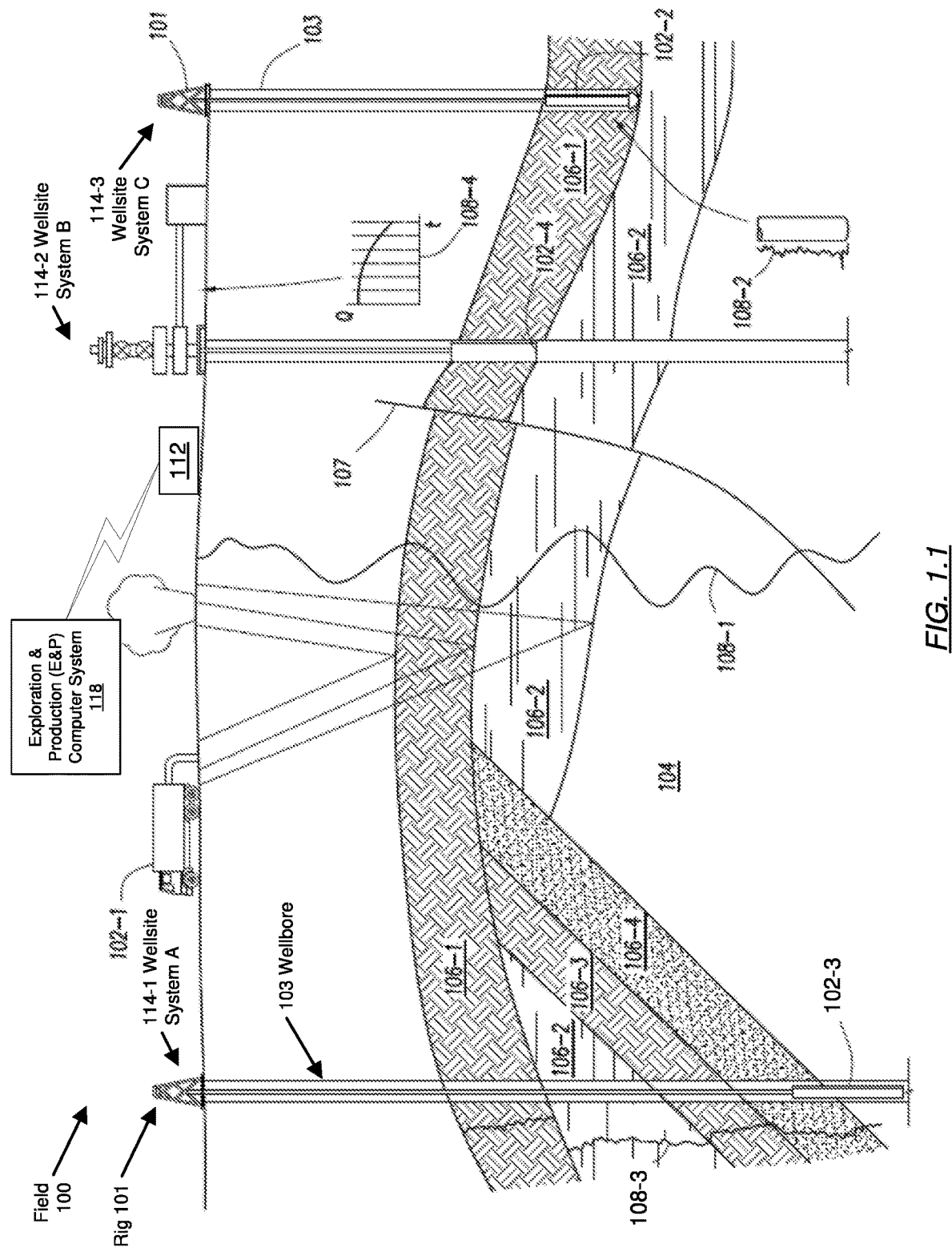
*FIG. 1.1*

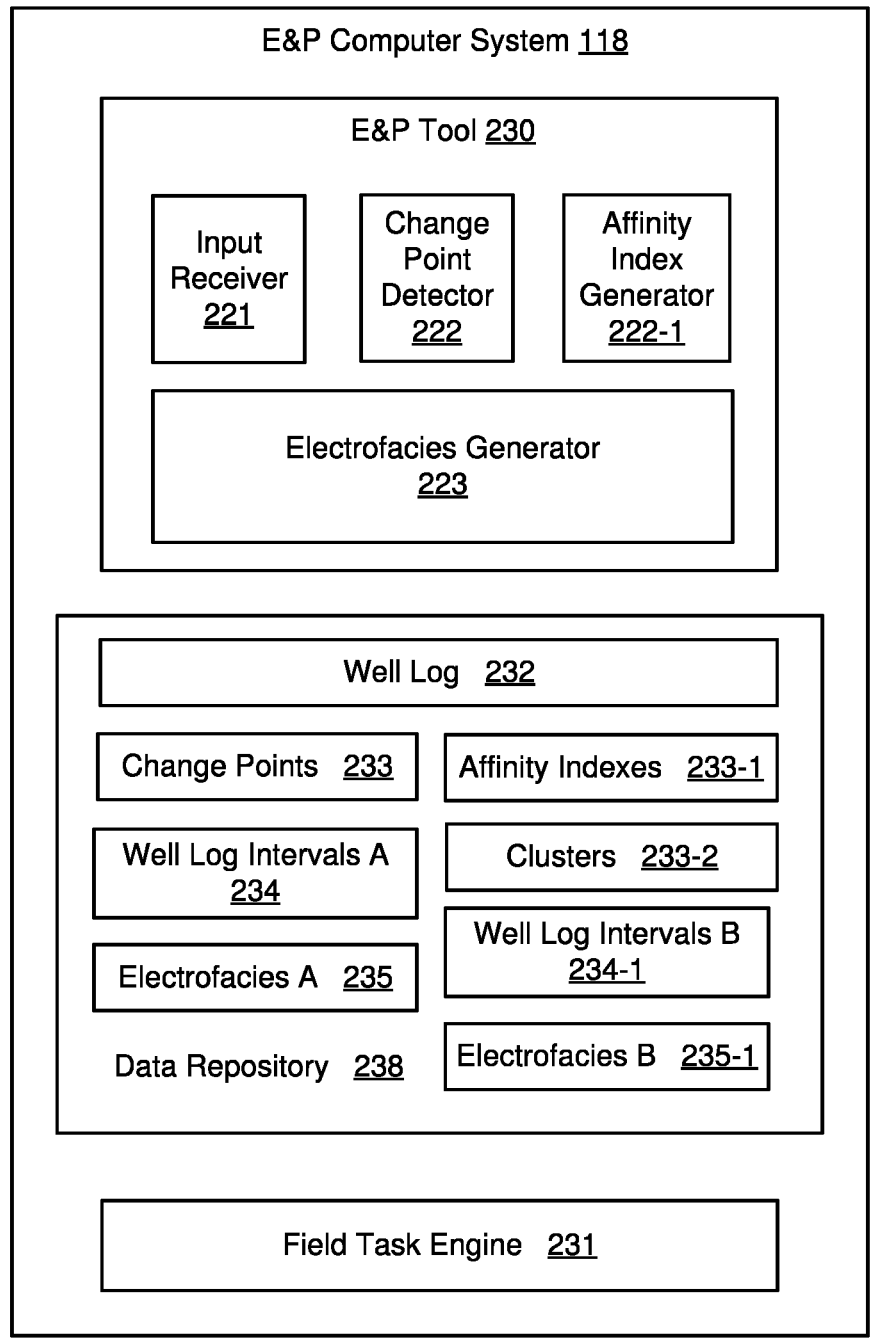
FIG. 1.2

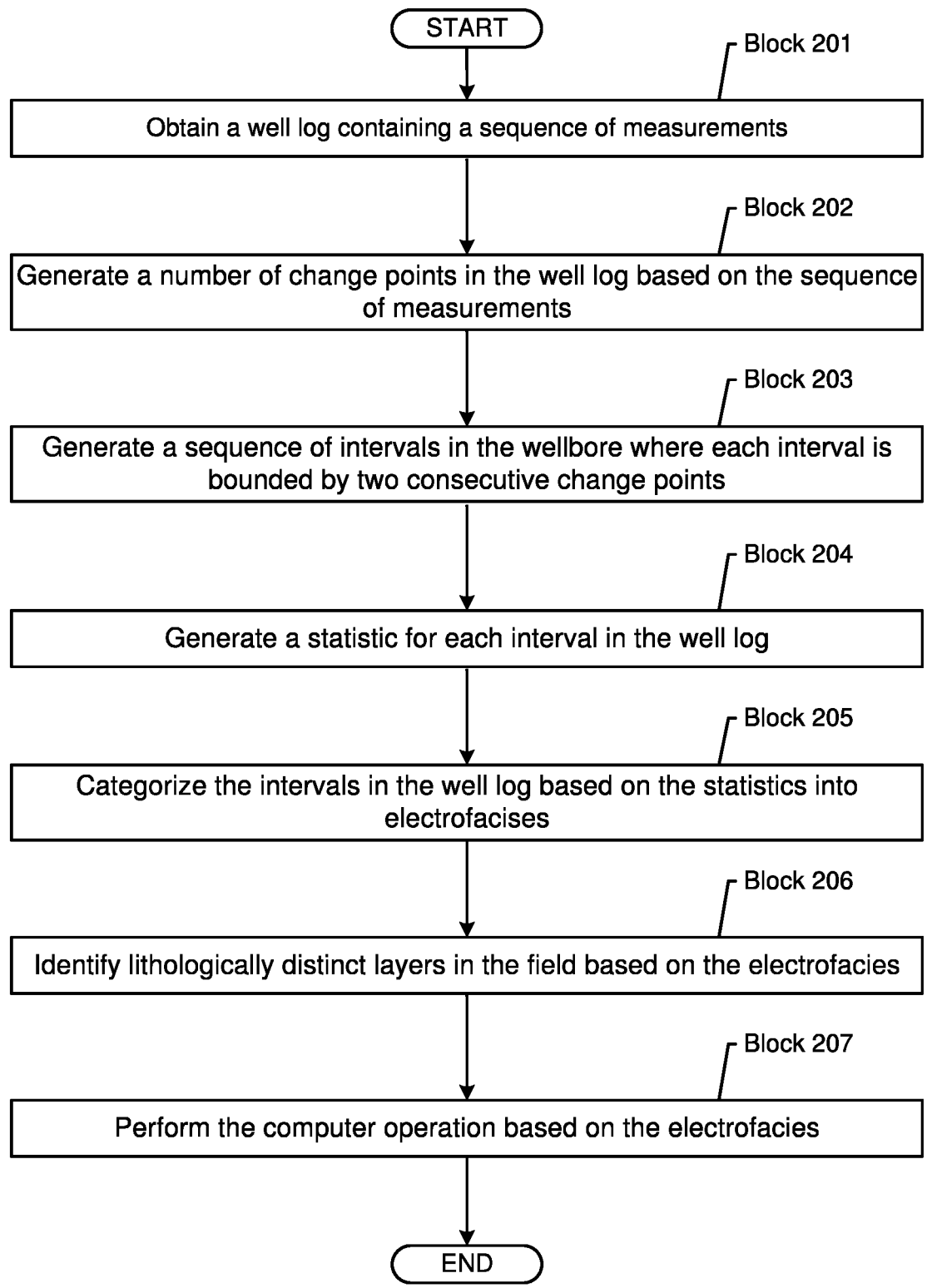
FIG. 2.1

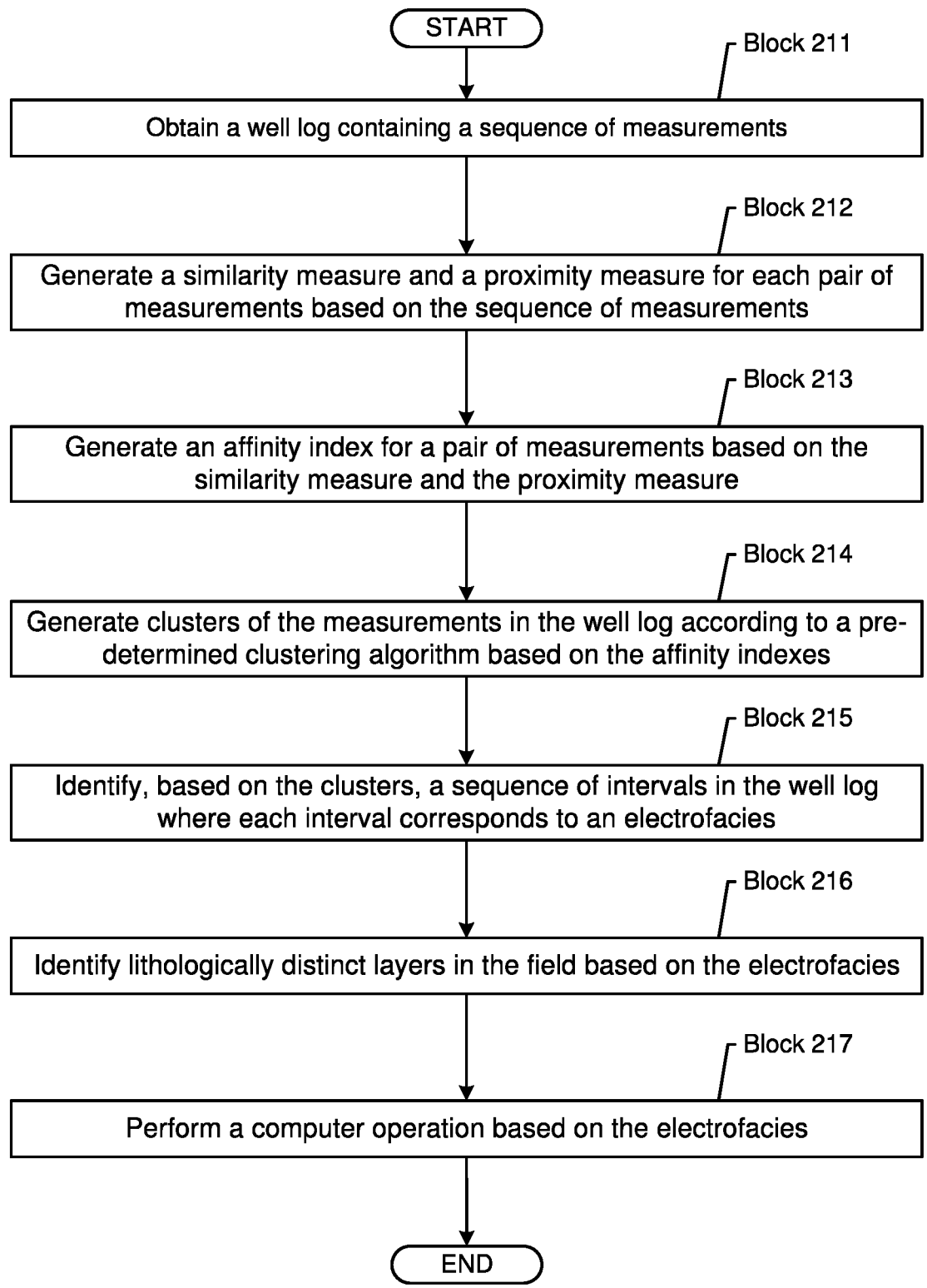
FIG. 2.2

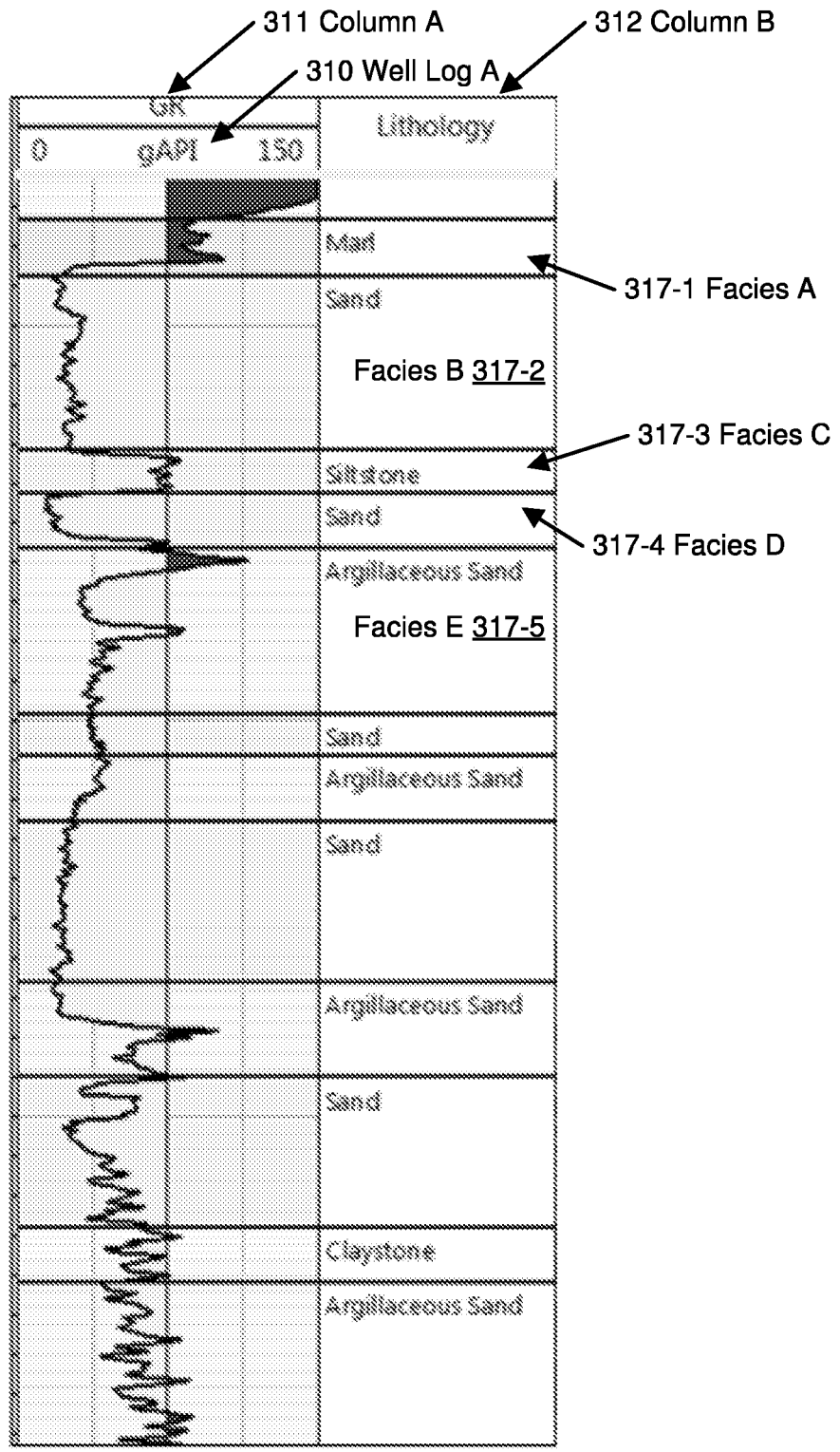
FIG. 3.1

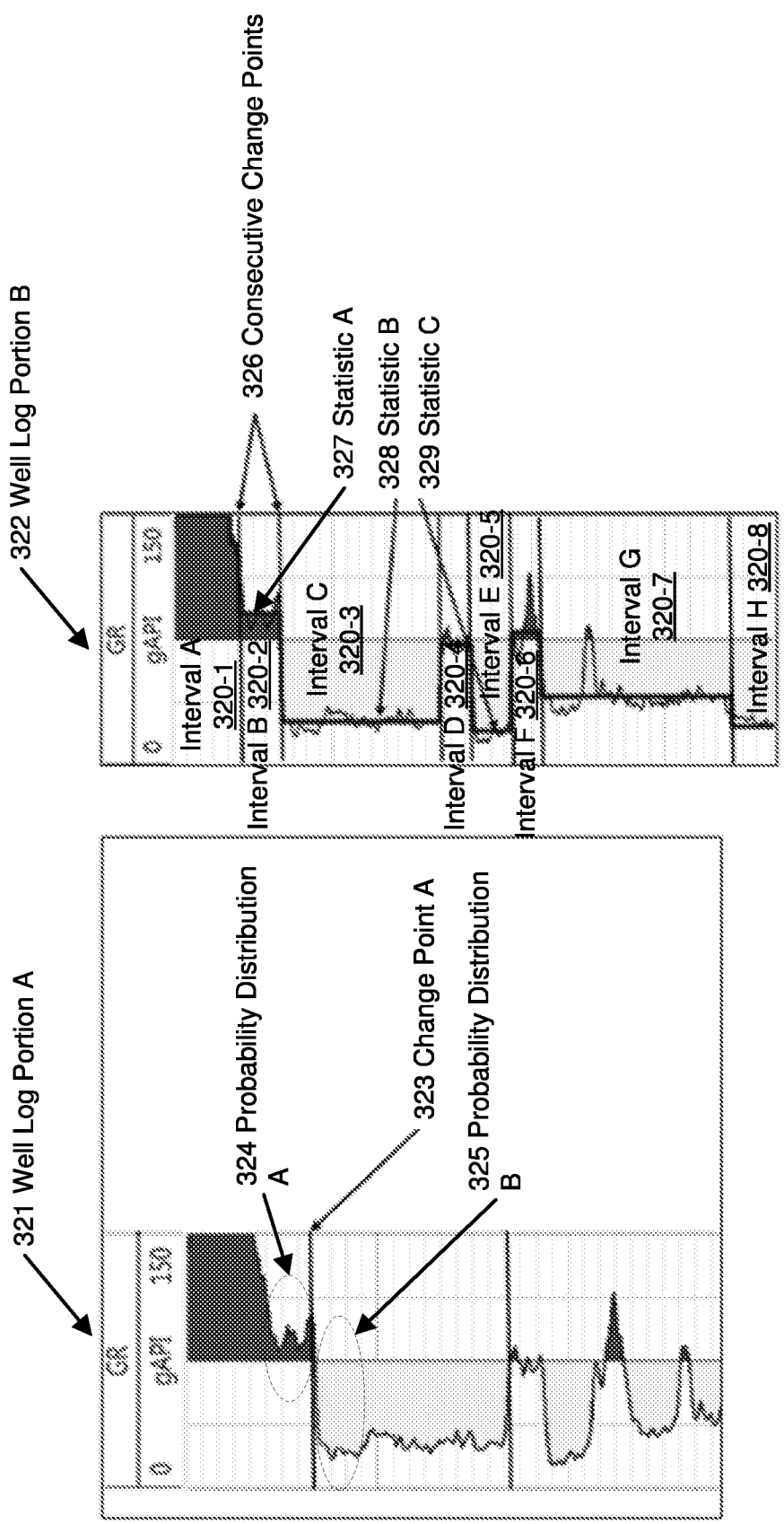
FIG. 3.2

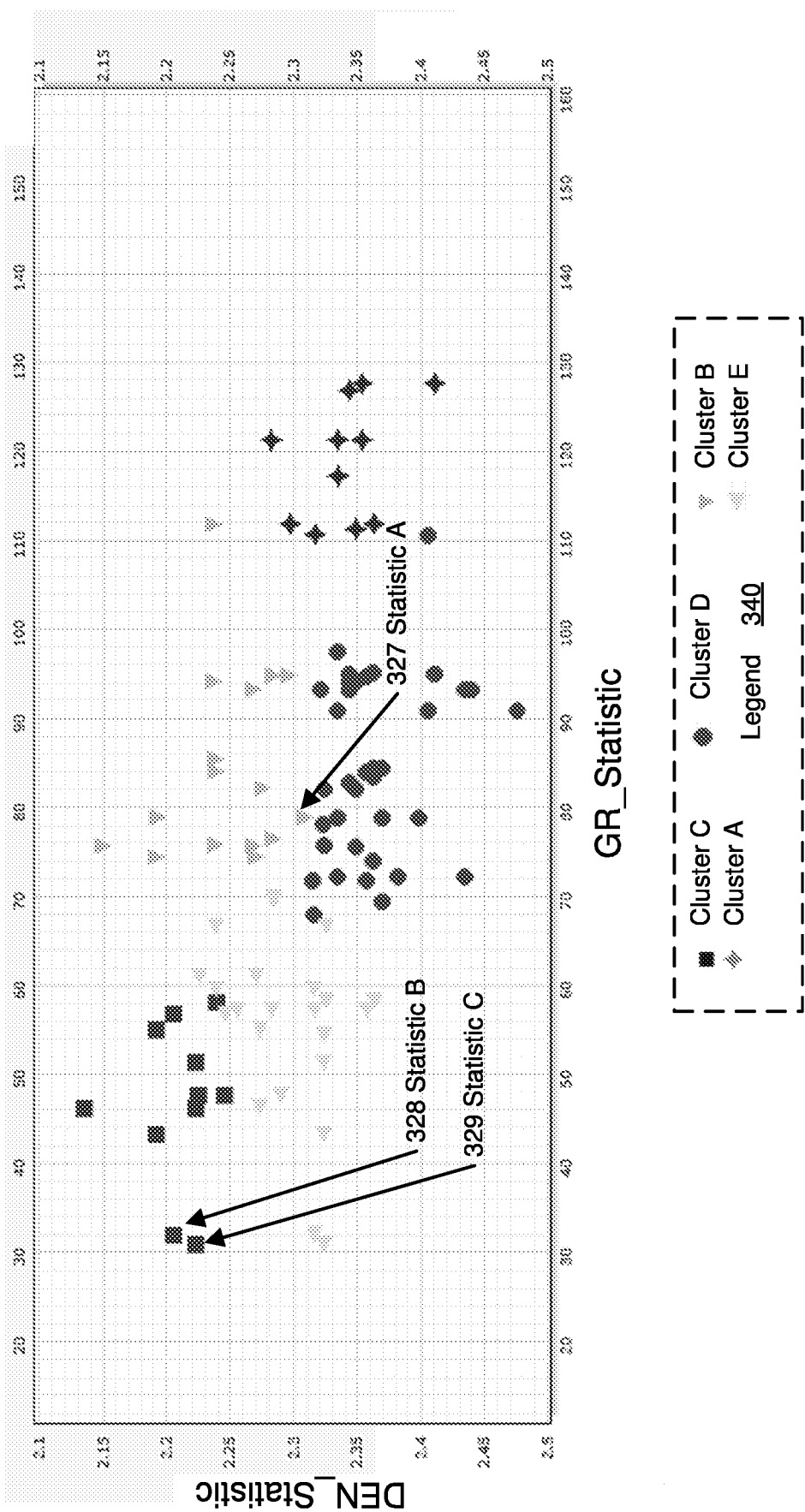
FIG. 3.3

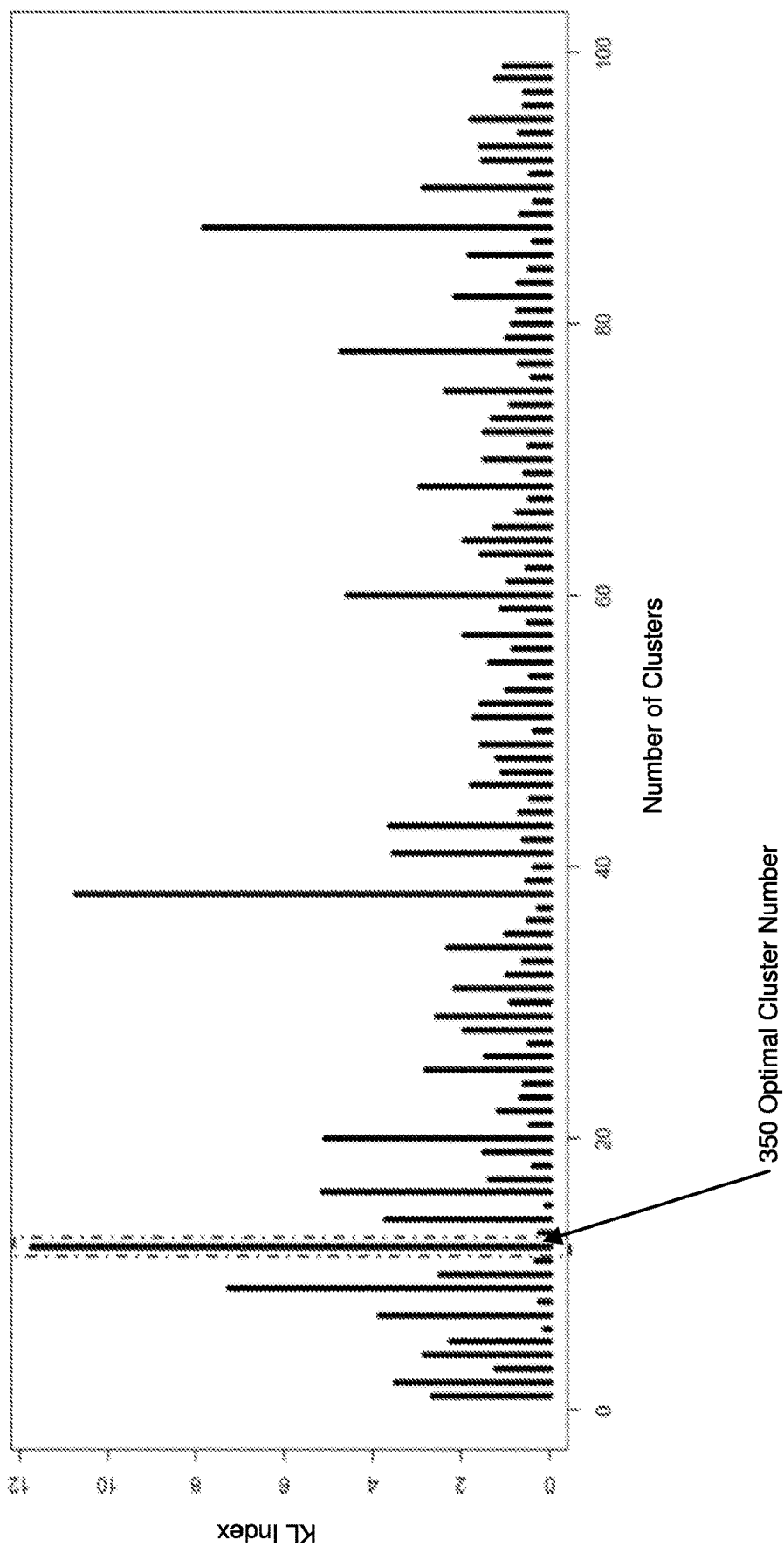
FIG. 3.4

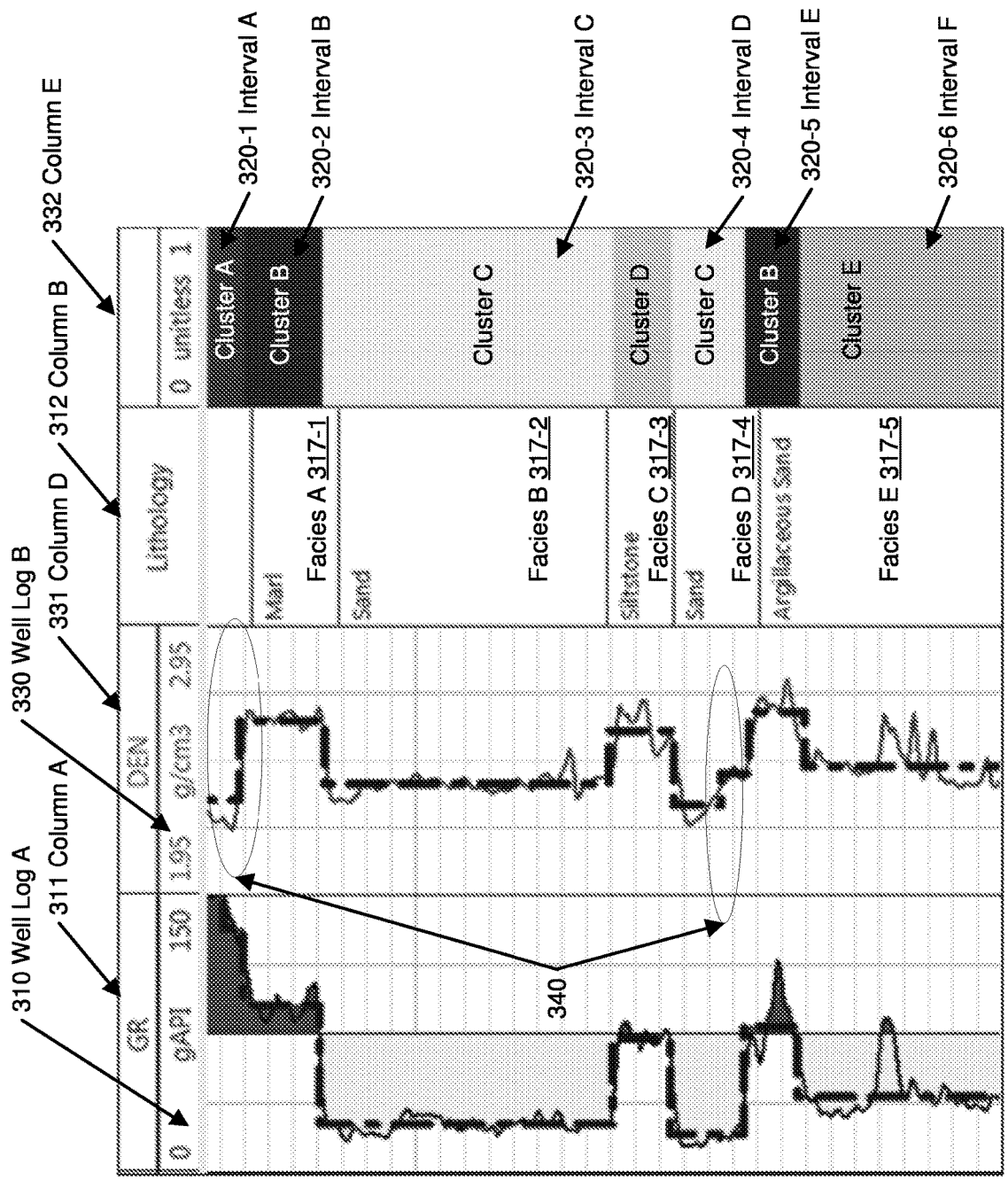
FIG. 3.5

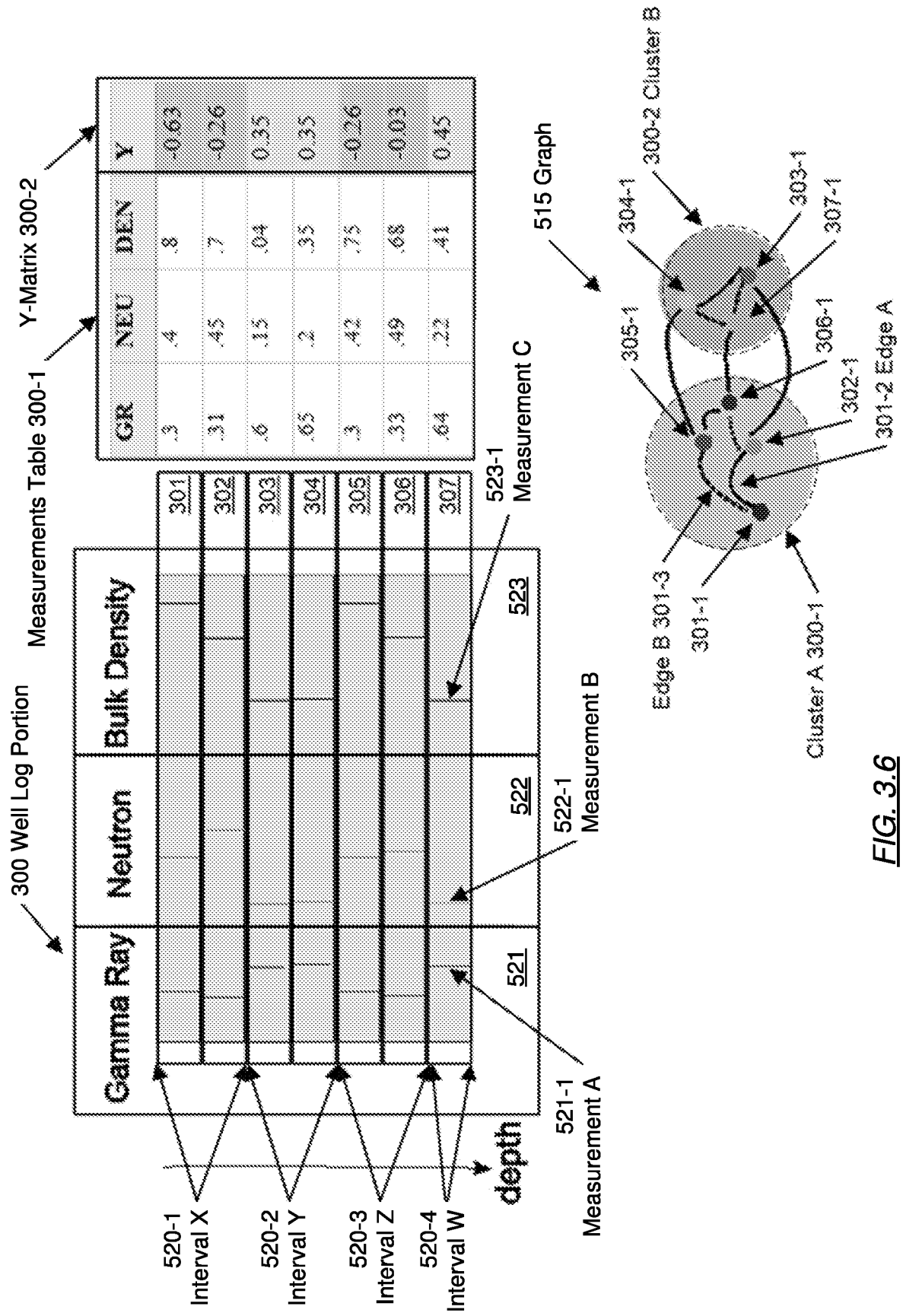
FIG. 3.6

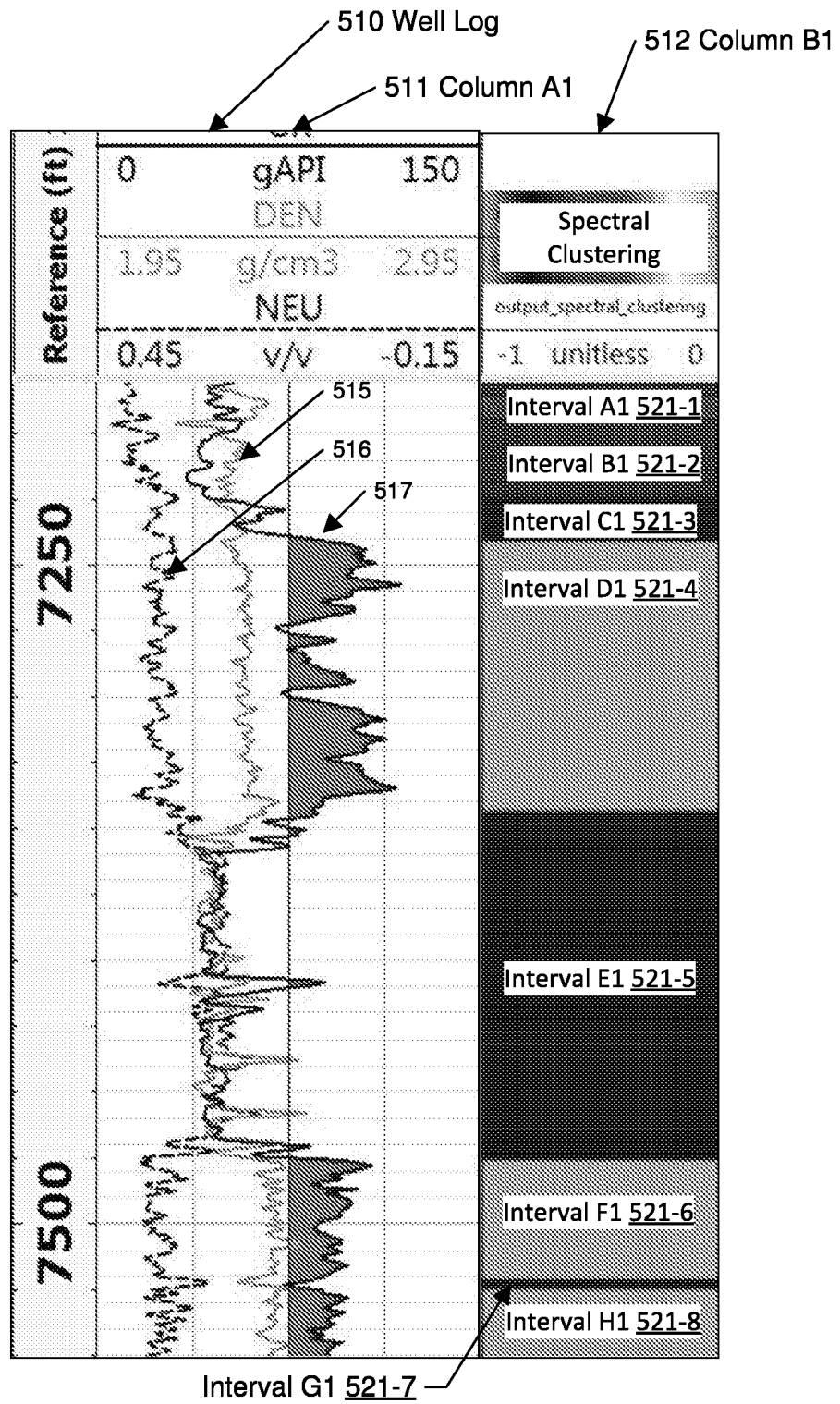
*FIG. 3.7*

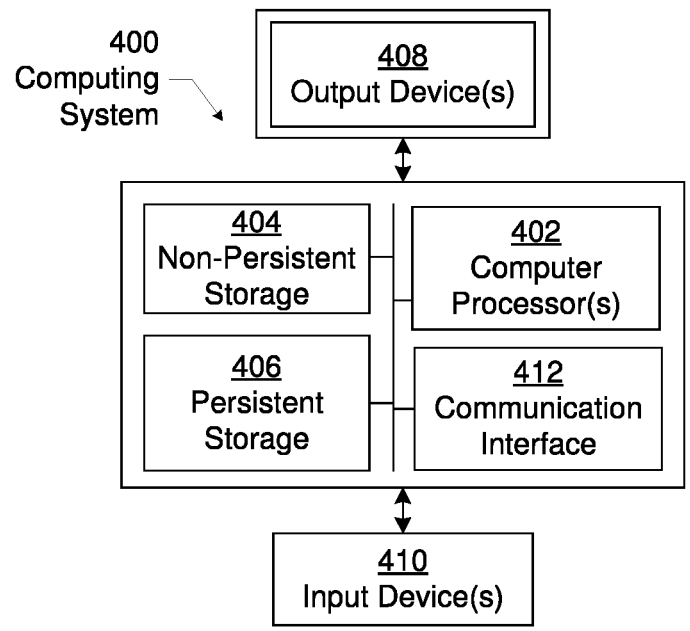
FIG. 4.1
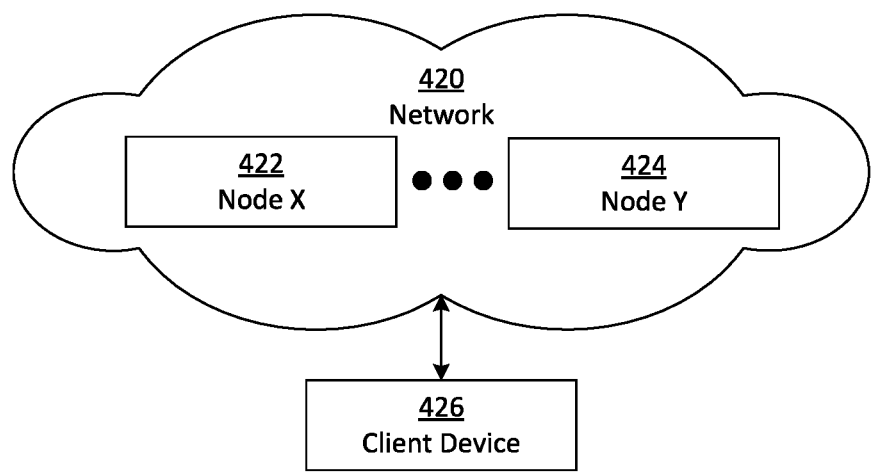
FIG. 4.2

ELECTROFACIES DETERMINATION

CROSS REFERENCE TO RELATED APPLICATIONS

This application claims priority to French Patent Application No. 1562075 filed Dec. 9, 2015, entitled "Electrofacies Determination Using Change Point Algorithms," with attorney docket number IS15.0994; 09469/313FR1. This application also claims priority to French Patent Application No. 1562079 filed Dec. 9, 2015, entitled "Depth Aware Unsupervised Clustering Using Spectral Clustering," with attorney docket number IS14.9851; 09469/319FR1. French Patent Application No. 1562075 and French Patent Application No. 1562079 are hereby incorporated by reference in their entirety.

BACKGROUND

Exploration and production (E&P) of hydrocarbons in a field, such as an oil field, may be analyzed and modeled based on characteristics of a reservoir, such as porosity and permeability. The facies refers to a body of rock with specified characteristics reflecting how the rock was formed. For example, a facies may be determined based on the appearance and other characteristics of a sedimentary deposit that are distinguished from contiguous deposits. The description of appearance and other visible characteristics is referred to as the lithology of the rock, such as color, texture, grain size, or composition of the rock. Different lithologies in the field may correspond to variations of reservoir characteristics.

Well logs such as gamma ray, sonic, or bulk density logs may be analyzed to determine intervals of similar log measurements referred to as electrofacies that are related to the facies and lithologies surrounding the wells.

SUMMARY

In general, in one aspect, electrofacies determination relates to a method for performing a computer operation. The method includes obtaining a well log comprising a sequence of measurements of a wellbore in a field, and generating change points in the well log based on the sequence of measurements. Each of the change points corresponds to a depth along the wellbore where a probability distribution of the well log changes. The method further includes generating a statistic for each of multiple intervals in the well log, where the intervals are defined by the change points, categorizing the intervals based on the statistic for each of the intervals to generate categorized intervals, and performing the operation based on the categorized intervals.

Other aspects will be apparent from the following description and the appended claims.

BRIEF DESCRIPTION OF DRAWINGS

The appended drawings illustrate several embodiments of electrofacies determination and are not to be considered limiting in scope. Indeed, electrofacies determination may admit to other equally effective embodiments.

FIG. 1.1 is a schematic view, partially in cross-section, of a field in which one or more embodiments of electrofacies determination may be implemented.

FIG. 1.2 shows a schematic diagram of a system in accordance with one or more embodiments.

FIGS. 2.1 and 2.2 show flowcharts in accordance with one or more embodiments.

FIGS. 3.1, 3.2, 3.3, 3.4, 3.5, 3.6, and 3.7 show an example in accordance with one or more embodiments.

FIGS. 4.1 and 4.2 show systems in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

In general, embodiments provide a method and system for determining electrofacies in a field to facilitate performing a computer operation. In one or more embodiments, change points in a well log are generated based on the sequence of measurements in the well log, where each change point corresponds to a depth along the wellbore where a probability distribution of the well log changes. Accordingly, the well log is analyzed to generate a statistic for each of a number of intervals in the well log that are defined by the change points in the well log. Based on the statistic, similar intervals are clustered and categorized as an electrofacies.

FIG. 1.1 depicts a schematic view, partially in cross section, of a field (100) in which one or more embodiments of electrofacies determination may be implemented. In one or more embodiments, one or more of the modules and elements shown in FIG. 1.1 may be omitted, repeated, and/or substituted. Accordingly, embodiments of electrofacies determination should not be considered limited to the specific arrangements of modules shown in FIG. 1.1.

As shown in FIG. 1.1, the field (100) includes the subterranean formation (104), data acquisition tools (102-1), (102-2), (102-3), and (102-4), wellsite system A (114-1), wellsite system B (114-2), wellsite system C (114-3), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). In one or more embodiments, data acquisition tools (102-1), (102-2), (102-3), and (102-4) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104). For example, data plots (108-1), (108-2), (108-3), and (108-4) are depicted along the field (100) to demonstrate the data generated by the data acquisition tools. Specifically, the static data plot (108-1) is a seismic two-way response time. Static plot (108-2) is core sample data measured from a core sample of the formation (104). Static data plot (108-3) is a logging trace, referred to as a well log. Production decline curve or graph (108-4) is a dynamic data plot of the fluid flow rate over time. Other data may also be collected, such as historical data, analyst user inputs, economic information, and/or other measurement data and other parameters of interest.

As further shown in FIG. 1.1, each of the wellsite system A (114-1), wellsite system B (114-2), and wellsite system C (114-3) is associated with a rig, a wellbore, and other wellsite equipment configured to perform wellbore operations, such as logging, drilling, fracturing, production, or other applicable operations. For example, the wellsite system A (114-1) is associated with a rig (101), a wellbore (103), and drilling equipment to perform drilling operation. Similarly, the wellsite system B (114-2) and wellsite system C (114-3) are associated with respective rigs, wellbores, and other wellsite equipment, such as production equipment and logging equipment, to perform production operations and logging operations, respectively. Generally, survey operations and wellbore operations are referred to as field operations of the field (100). In addition, data acquisition tools and wellsite equipment are referred to as field operation equipment. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-2), (102-3), (102-4), and/or the wellsite systems. In particular, the surface unit (112) is configured to send commands to the data acquisition tools (102-1), (102-2), (102-3), (102-4), and/or the wellsite systems, and to receive data therefrom. In one or more embodiments, surface unit (112) may be located at the wellsite system A (114-1), wellsite system B (114-2), wellsite system C (114-3), and/or remote locations. The surface unit (112) may be provided with computer facilities (e.g., an E&P computer system (118)) for receiving, storing, processing, and/or analyzing data from the data acquisition tools (102-1), (102-2), (102-3), (102-4), the wellsite system A (114-1), wellsite system B (114-2), wellsite system C (114-3), and/or other parts of the field (104). The surface unit (112) may also be provided with or have functionality for actuating mechanisms at the field (100). The surface unit (112) may then send command signals to the field (100) in response to data received, stored, processed, and/or analyzed, for example, to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as analyzing well logs to determine electrofacies in the subterranean formation (104) or performing simulation, planning, and optimization of production operations of the wellsite system A (114-1), wellsite system B (114-2), and/or wellsite system C (114-3). In one or more embodiments, the result generated by the E&P computer system (118) may be displayed for analyst user viewing using a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

FIG. 1.2 shows more details of the E&P computer system (118) in which one or more embodiments of electrofacies determination may be implemented. In one or more embodiments, one or more of the modules and elements shown in FIG. 1.2 may be omitted, repeated, and/or substituted. Accordingly, embodiments of electrofacies determination should not be considered limited to the specific arrangements of modules shown in FIG. 1.2.

As shown in FIG. 1.2, the E&P computer system (118) includes an E&P tool (230), a data repository (238) for storing intermediate data and resultant outputs of the E&P tool (230), and a field task engine (231) for performing various tasks of the field operation. In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, the intermediate data and resultant outputs of the E&P tool (230) include the well log (232), change points (233), well log intervals A (234), electrofacies A (235), affinity indexes (233-1), clusters (233-2), well log intervals B (234-1), and electrofacies B (235-1). In one or more embodiments, the well log (232) contains a sequence of measurements of a wellbore in the field, such as the wellbore (103) in the field (100) depicted in FIG. 1.1 above. For example, the well log (232) may include a gamma ray log, a sonic log, a bulk density log, and/or other types of logging results generated by a data acquisition tool, such as the data acquisition tool (102-3) depicted in FIG. 1.1 above. In one or more embodiments, multiple well logs are aggregated to form a well log containing multiple types of measurements. For example, each of the sequence of measurements in the well log (232) may contain a gamma ray measurement and a bulk density measurement. In this example, each measurement has a two-dimensional vector value formed by the gamma ray measurement and bulk density measurement. In one or more embodiments, a cluster (e.g., among the clusters (233-2)) is a collection of measurements in the well log (232).

In one or more embodiments, a well log interval (e.g., among the well log intervals A (234) or well log intervals B (234-1)) is a segment of the sequence of measurements in the well log where the segment contains consecutive measurements obtained within a depth range along the wellbore. In particular, the well log interval corresponds to the depth range where the measurements within the well log interval are obtained. Throughout the discussion below depending on the context, the term "interval" may refer to the well log interval or the depth range corresponding to the well log interval. Well log intervals with similar measurements are collectively referred to as an electrofacies. In one or more embodiments, an electrofacies includes well log intervals (e.g., among the well log intervals A (234) or well log intervals B (234-1)) with measurements within a pre-determined value range. An electrofacies may include a single well log interval if the well log interval does not share similar measurements with any other well log interval. As shown in FIG. 1.2, the well log intervals A (234) include multiple well log intervals corresponding to multiple electrofacies referred to as the electrofacies A (235). Similarly, the well log intervals B (234-1) include multiple well log intervals corresponding to multiple electrofacies referred to as the electrofacies B (235-1).

In one or more embodiments, each change point of the change points (233) corresponds to a depth along the wellbore (e.g., wellbore (103)) where a probability distribution within a section of the well log (232) changes between consecutive sections. In particular, the probability distribution within a particular section refers to a statistical distribution that assigns a probability to a possible outcome of the logging measurement within the section. The probability distribution throughout the depths of the well log (232) is determined based on measurement values in the sequence of measurements contained in the well log (232). An example of a probability distribution change and corresponding change points is described with reference to FIG. 3.2 below.

In one or more embodiments, an affinity index (e.g., among the affinity indexes (233-1)) corresponds to a pair of measurements in the sequence of the measurements of the well log (e.g., well log (232). Specifically, the affinity index for a pair of measurements is based on a similarity measure of the two measurements and a proximity measure of two corresponding depths of the two measurements. In particular, the similarity measure represents a level of similarity between the values of the two measurements while the proximity measure represents a physical distance between the two corresponding depths. An example of the similarity measure, proximity measure, and affinity index is described with reference to FIG. 3.1 below.

In one or more embodiments, the E&P tool (230) includes the input receiver (221), the change point detector (222), the affinity index generator (222-1), and the electrofacies generator (223). Each of these components of the E&P tool (230) is described below.

In one or more embodiments, the input receiver (221) is configured to obtain well logs (e.g., well log (232)) for analysis by the change point detector (222), the affinity index generator (222-1), and the electrofacies generator (223). In one or more embodiments, the input receiver (221) obtains the well log (232) from the surface unit (112) depicted in FIG. 1.1 above. For example, the input receiver (221) may obtain well logs from the surface unit (112) intermittently, periodically, in response to user activation, or triggered by an event. Accordingly, the intermediate and final results of the change point detector (222), the affinity index generator (222-1), and the electrofacies generator (223) may be generated intermittently, periodically, in response to user activation, or triggered by an event.

In one or more embodiments, the change point detector (222) is configured to generate a number of change points (e.g., change points (233)) based on the sequence of measurements contained in the well log (232). In one or more embodiments, the change point detector (222) generates the change points (233) using the method described with reference to FIG. 2.1 below. An example of generating the change points (233) based on the well log (232) is described with reference to FIGS. 3.1-3.4 below.

In one or more embodiments, the affinity index generator (222-1) is configured to generate a number of affinity indexes (e.g., affinity indexes (233-1)) based on the sequence of measurements included in the well log (232). In one or more embodiments, the affinity index generator (222-1) generates the affinity indexes (233-1) using the method described with reference to FIG. 2.2 below. An example of generating the affinity indexes (233-1) based on the well log (232) is described with reference to FIG. 3.6 below.

In one or more embodiments, the electrofacies generator (223) is configured to generate a statistic for each of a number of intervals (e.g., well log intervals A (234)) in the well log (232) that are defined by the change points (233) in the well log (232). The electrofacies generator (223) is further configured to categorize the well log intervals A (234) based on the statistic for each of the well log intervals A (234) to generate a number of categorized intervals, which are stored in the data repository (238) as the electrofacies A (235). In one or more embodiments, the electrofacies A (235) is used by the field task engine (231) to facilitate performing a field operation.

In one or more embodiments, the electrofacies generator (223) generates the electrofacies A (235) using the method described with reference to FIG. 2.1 below. An example of generating the electrofacies A (235) is described with reference to FIGS. 3.1-3.4 below.

In one or more embodiments, the electrofacies generator (223) is further configured to generate, according to a pre-determined clustering algorithm based on the affinity indexes (233-1) of the well log (232), the clusters (233-2) of the measurements in the well log (232). In one or more embodiments, the electrofacies B (235-1) is used by the field task engine (231) to facilitate performing a field operation.

In one or more embodiments, the electrofacies generator (223) generates the electrofacies B (235-1) using the method described with reference to FIG. 2.2 below. An example of generating the electrofacies B (235-1) is described with reference to FIG. 3.6 below.

In one or more embodiments, the E&P computer system (118) includes the field task engine (231) that is configured to generate a field operation control signal based at least on a result generated by the E&P tool (230), such as based on the electrofacies A (235) and/or electrofacies B (235-1). As noted above, the field operation equipment depicted in FIG. 1.1 may be controlled by the field operation control signal. For example, the field operation control signal may be used to control drilling equipment, an actuator, a fluid valve, or other electrical and/or mechanical devices disposed about the field (100) depicted in FIG. 1.1 above. In particular, the field planning operation, drilling operation, production operation, etc. may be performed based on the bodies of rocks identified by the electrofacies A (235) and/or electrofacies B (235-1).

The E&P computer system (118) may include one or more system computers, such as shown in FIG. 4 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, hand-held devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIG. 2.1 depicts an example method in accordance with one or more embodiments. For example, the method depicted in FIG. 2.1 may be practiced using the E&P computer system (118) described with reference to FIGS. 1.1 and 1.2 above. In one or more embodiments, one or more of the elements shown in FIG. 2.1 may be omitted, repeated, and/or performed in a different order. Accordingly, embodiments of electrofacies determination should not be considered limited to the specific arrangements of elements shown in FIG. 2.1.

In Block 201, a well log is obtained. In one or more embodiments, the well log contains a sequence of measurements of a wellbore in the field. Each measurement represents a characteristic of surrounding rock at a particular depth of the wellbore. For example, the sequence of measurements may be generated by performing a gamma ray logging, a sonic logging, and/or a bulk density logging of the wellbore. In one or more embodiments, multiple well logs are aggregated to form a well log containing multiple types of measurements. For example, a gamma ray measurement and a bulk density measurement may be aggregated to form a two-dimensional vector value for a measurement in the well log. An example of a well log is described with reference to FIG. 3.1 below. An example of a well log containing vector values is described with reference to FIG. 3.3 below.

In Block 202, a number of change points in the well log is generated based on the sequence of measurements. In one or more embodiments, the sequence of measurements is analyzed to generate a probability distribution of measurement values for each of a sequence of contiguous sections of the well log. Accordingly, each change point corresponds to a depth along the wellbore where the probability distribution changes. In one or more embodiments, the depth range of each of the contiguous well log sections is iteratively adjusted to detect the depth where the probability distribution changes and generate the corresponding change point.

In one or more embodiments, the sequence of measurements is analyzed according to a pre-determined change point detection algorithm to generate the plurality of change points. For example, the pre-determined change point detection algorithm may include a series of binary segmentations each preformed on an iteratively segmented portion of the sequence of measurements. In other words, during each iteration, each of the contiguous well log sections is divided into two contiguous well log sections with reduced depth ranges. The probability distributions of the two contiguous well log sections are recalculated until a difference in the probability distributions between two consecutive well log sections exceeds a pre-determined threshold. The intervening depth between the two consecutive well log sections is determined as a change point. In other words, the probability distribution changes more than the pre-determined threshold from one side of the change point to the other side of the change point along the wellbore.

In one or more embodiments, the change points generation is mathematically represented by the equations below.

Eq. 1 represents the well log where $y_i$ denotes a measurement value, and n is the number of measurement values in the sequence of measurements of the well log.

$$y_{1:n} = (y_1, \ldots, y_n) \qquad \text{Eq. 1}$$

Eq. 2 represents m ordered possible positions of change points where $\tau_i$ denotes a possible position (i.e., from 1 through n) of change point in the sequence of measurements. The m change points divide the well log into a sequence of M+1 segments.

$$\tau_{1:m} = (\tau_1, \ldots, \tau_m) \qquad \text{Eq. 2}$$

Eq. 3 represents an expression whose numerical quantity is to be minimized by the change point detection algorithm in order to find the optimal change points.

$$\Sigma_{i=}^{m+1} C(y_{\tau_{i-1}+1):\tau_i}) + \beta f(m) \qquad \text{Eq. 3}$$

In particular, ($y_{\tau_{i-1}+1):\tau_i}$ is the $i^{th}$ segment in the sequence of M+1 segments and corresponding to a position range from $T_{i-1}+1$ to $T_i$, $\beta f(m)$ is a penalty function to avoid overfitting, and C is a variance function that may be a likelihood function.

Eq. 4 is an example variance function representing variance of a normal distribution where $x_j$ denotes a measurement at one depth and $\mu$ is the mean of the measurements within the interval over which C is calculated. In one or more embodiments, the probability distribution is modeled as a normal distribution, and the variance function of Eq. 4 represents the variance of the measurement values from the normal distribution over an interval bounded by two change points.

$$C = \hat{\sigma}_n^2 = \frac{1}{n}\sum_{i=1}^{n}(x_j - \hat{\mu})^2 \qquad \text{Eq. 4}$$

In one or more embodiments, the change points generation uses a binary segmentation approach where minimizing the expression of Eq. 3 is by iteratively evaluating the inequality of Eq. 5 below.

$$C(y_{i:\tau}) + C(y_{(\tau+1):n}) + \beta C(y_{1:n}) \qquad \text{Eq. 5}$$

If the inequality of Eq. 5 is true, the T position is identified as a change point, and the sequence of the M+1 segments is split at the τ position into two sub-sequences. The method is iterated on each of the two sub-sequences. Although the above describes one approach for determining change points, other approaches exist that may be used without departing from the scope of one or more embodiments.

An example of change points in a well log is described with reference to FIG. 3.2 below.

In Block 203, a sequence of intervals in the wellbore is generated where each interval is bounded by the two consecutive change points along the wellbore. An example of generating the sequence of intervals in a well log is described with reference to FIG. 3.2 below.

In Block 204, the sequence of measurements is further analyzed to generate a statistic for each interval in the well log. Specifically, the statistic of an interval is based on the portion of the well log corresponding to the interval. In one or more embodiments, the statistic includes an average, median, range, maximum, minimum, and/or other statistical measure of the corresponding portion of the well log. In one or more embodiments, the average, median, range, maximum, minimum, and/or other statistical measure are chosen such that the statistics of the intervals in the well log correlate with the lithologies of rocks surrounding the wellbore. In other words, the statistic of an interval correlates with a visible characteristic of a corresponding body of rock penetrated by the wellbore.

In Block 205, the intervals in the well log are categorized based on the statistics to generate a number of categorized intervals. Each categorized interval may include a cluster of intervals having similar statistics. In other words, the statistics of the intervals in a cluster are within a pre-determined value range. In addition, the statistics of the intervals in different clusters differ by more than the pre-determined value range.

In one or more embodiments, the statistics are analyzed using a clustering algorithm (e.g., the K-means clustering algorithm) to generate the cluster of intervals. In one or more embodiments, the statistics are analyzed to determine an optimal cluster number before the optimal number is used as an input to the clustering algorithm. In one or more embodiments, determining the optimal cluster number includes calculating a pre-determined index of the statistics as a function of possible cluster numbers. The cluster number corresponding to a maximum index value of the function is then selected as the optimal cluster number. In one or more embodiments, the pre-determined index is selected heuristically depending on statistical patterns found in the measurements of the well log. Examples of the pre-determined indexes, such as the KL (Krzanowski and Lai) index, are described in an journal article "NbClust: An R Package for Determining the Relevant Number of Clusters in a Data Set," by Charrad M., Ghazzali N., Boiteau V., and Niknafs A in *Journal of Statistical Software*, 61(6), 1-36 (2014). An example of generating the optimal cluster number using the KL index and applying the clustering algorithm based on the optimal cluster number is described with reference to FIGS. 3.3 and 3.4 below.

In one or more embodiments, the well log includes multiple measurement types and each statistic includes a vector value based on the multiple measurement types. In such embodiments, the difference between the statistics of two intervals corresponds to a Cartesian distance between two corresponding vector values. Each cluster may include a single interval or multiple intervals. Multiple intervals in a categorized interval may include disjoint intervals of the well log. In one or more embodiments, a categorized interval is referred to as an electrofacies. An example of categorizing the intervals of a well log into multiple electrofacies is described with reference to FIG. 3.3 below.

In Block 206, lithologically distinct layers penetrated by the wellbore are identified in the field based on the electrofacies that are identified above. In one or more embodiments, each electrofacies corresponds to a lithologically distinct layer having distinguishable lithology from adjacent layers.

In Block 207, a computer operation is performed based on the electrofacies, i.e., the categorized intervals in the well log. For example, the computer operation may be any operation involving the computer, such as presenting, storing, or other such operation discussed below with reference to FIGS. 4.1 and 4.2, sending a control signal to field equipment to perform a field operation, generating a field development plan on or by a computer, and/or performing the field operation. During exploration and production of a field, estimation of porosity and permeability are used for reservoir characterization. The variation of indicators such as porosity and permeability corresponds to different lithology used to describe the reservoir behavior. Accordingly, the electrofacie correlates with lithology of rocks and variation of porosity and permeability. Based on such correlation, a field development plan may be defined based on the electrofacies that are identified above. The field development plan may include locations where exploration wells and/or productions wells are to be drilled. Accordingly, drilling operations and subsequent production operations may be performed to extract hydrocarbons according to the field development plan.

In another example, operating parameters of a drilling operation and/or production operation may be determined and/or adjusted based on the electrofacies that are identified above. Accordingly, a field operation control signal is generated based on the operating parameters and sent from a surface unit to the field operation equipment for the drilling operation and/or production operation.

FIG. 2.2 depicts an example method in accordance with one or more embodiments. For example, the method depicted in FIG. 2.2 may be practiced using the E&P computer system (118) described with reference to FIGS. 1.1 and 1.2 above. In one or more embodiments, one or more of the elements shown in FIG. 2.2 may be omitted, repeated, and/or performed in a different order. Accordingly, embodiments of depth aware unsupervised clustering using spectral clustering should not be considered limited to the specific arrangements of elements shown in FIG. 2.2.

In Block 211, a well log is obtained. In one or more embodiments, the well log includes a sequence of measurements of a wellbore in the field. Each measurement represents a characteristic of surrounding rock at a particular depth of the wellbore. The well log may be obtained, for example, by the sensors on the drilling while logging tool on the drill string measuring the characteristics of the surrounding rock. For example, the sequence of measurements may be generated by performing a gamma ray logging, a neutron logging, and/or a bulk density logging of the wellbore. In one or more embodiments, multiple well logs are aggregated to form a well log including multiple types of measurements. For example, a gamma ray measurement and a bulk density measurement may be aggregated to form a two-dimensional vector value for a measurement in the well log. An example of a well log including vector values is described with reference to FIGS. 3.6 and 3.7 below.

In Block 212, a similarity measure and a proximity measure are generated for each pair of measurements in the well log. In particular, the similarity measure represents how similar two measurements are in the well log. The proximity measure represents how close the positions of the two measurements are in the sequence of measurement of the well log.

In one or more embodiments, the similarity measure is generated based on a difference, a ratio, or other comparison between the two measurements. In one or more embodiments, the measurement has a vector value from at least a first measurement and a second measurement. For example, the first measurement may be a gamma ray measurement and the second measurement may be a bulk density measurement. In such embodiments, generating the similarity measure includes generating a first similarity measure and a second similarity measure corresponding to the first measurement and the second measurement, respectively. Specifically, the first similarity measure is based on the first measurement of each of the two measurements in the pair. For example, the first similarity measure may represent a level of similarity between two gamma ray measurements of the pair of measurements. Similarly, the second similarity measure is based on the second measurement of each of the two measurements in the pair. For example, the second similarity measure may represent a level of similarity between two bulk density measurements of the pair of measurements. Accordingly, the first similarity measure and the second similarity measure are aggregated to generate the similarity measure of the two measurements.

In one or more embodiments, a vector space of the sequence of measurements in the well log is identified. Specifically, each measurement in the well log corresponds to a point in the vector space where the point is defined by a vector based on the first measurement and the second measurement. For example, the gamma ray measurement and bulk density measurement may correspond to two of the dimensions of the vector space. In one or more embodiments, the similarity measure is generated based on a Euclidean distance between the two measurements in the vector space. In particular, the Euclidean distance corresponds to a length of the line segment connecting two points in the vector space.

As noted above, the well log includes a sequence of measurements corresponding to a sequence of depths along the wellbore. In one or more embodiments, the proximity measure of two measurements in the well log is generated based on a difference, a ratio, or other comparison between two corresponding depths of the two measurements or between two corresponding positions of the two measurements in the sequence of measurements.

In Block 213, affinity indexes are generated corresponding to pairs of measurements in the well log. Each affinity index represents a level of a pre-determined relationship between a pair of measurement. For example, the pre-determined relationship may correspond to a similarity of measurement levels, a proximity between positions of the measurements, or a combination of both. In one or more embodiments, an affinity index for a pair of measurements is based on the aforementioned similarity measure and the aforementioned proximity measure. In one or more embodiments, the affinity index is proportional to the similarity measure and the proximity measure.

In Block 214, a number of clusters of the measurements in the well log are generated according to a pre-determined clustering algorithm based on the affinity indexes. For example, the pre-determined clustering algorithm may generate the clusters based on the affinity index for any pair of measurements within a single cluster to exceed a pre-determined threshold. In addition, the pre-determined clustering algorithm may generate the clusters further based on the affinity index for any two measurements belonging to different clusters to be less than the pre-determined threshold. In one or more embodiments, each cluster of measurements corresponds to rock segments surrounding the wellbore that share the same lithology.

In Block 215, a sequence of intervals in the well log is identified based on the clusters. In particular, each interval corresponds to a number of consecutive measurements found in a single cluster and corresponds to a segment of the wellbore. In one or more embodiments, each cluster may correspond to a single interval or multiple non-overlapping intervals. In one or more embodiments, each interval is identified as an electrofacies based on the lithology of a cluster to which the interval belongs.

In Block 216, lithologically distinct layers penetrated by the wellbore are identified in the field based on the electrofacies that are identified above. In one or more embodiments, each electrofacies corresponds to a lithologically distinct layer having a distinguishable lithology from adjacent layers.

In Block 217, a computer operation is performed based on the electrofacies, i.e., the intervals in the well log. For example, the computer operation may be any operation involving the computer, such as presenting, storing, or other such operation discussed below with reference to FIGS. 4.1 and 4.2, sending a control signal to field equipment to perform a field operation, generating a field development plan on or by a computer, and/or performing the field operation. During exploration and production of a field, estimation of porosity and permeability are used for reservoir characterization. The variation of indicators such as porosity and permeability corresponds to different lithology used to describe the reservoir behavior. Accordingly, the electrofacies correlates with lithology of rocks and variation of porosity and permeability. Based on such correlation, a field development plan may be defined based on the electrofacies that are identified above. The field development plan may include locations where exploration wells and/or production wells are to be drilled. Accordingly, drilling operations and subsequent production operations may be performed to extract hydrocarbons according to the field development plan.

In another example, operating parameters of a drilling operation and/or production operation may be determined and/or adjusted based on the electrofacies that are identified above. Accordingly, a field operation control signal is generated based on the operating parameters and is sent from a surface unit to the field operation equipment for the drilling operation and/or production operation.

FIGS. 3.1, 3.2, 3.3, 3.4, and 3.5 show an example in accordance with one or more embodiments. In one or more embodiments, the example shown in these figures may be practiced using the E&P computer system shown in FIGS. 1.1 and 1.2, and the method described with reference to FIG. 2.1 above. The following example is for example purposes and is not intended to limit the scope of the claims.

FIG. 3.1 shows a clustering method of identifying electrofacies from a well log. In particular, the column A (311) shows a well log A (310), which is a gamma ray (GR) log where the horizontal direction of the well log A (310) represents GR measurement values (denoted as the wiggly (i.e., curvy) line) and the vertical direction of the well log A (310) represents depths along the wellbore. In addition, the column B (312) shows lithology of rocks surrounding the wellbore that is identified, e.g., based on core samples retrieved from the wellbore. For example, a portion of the well log A (310) corresponds to a depth range where the identified lithology "Marl" indicates a rock layer referred to as the facies A (317-1). Similarly, a sequence of adjacent portions the of the well log A (310) corresponds to a sequence of depth ranges where the identified lithology sequence "Sand," "Siltstone," "Sand," "Argillaceous Sand," etc. indicates a sequence of rock layers referred to as the facies B (317-2), facies C (317-3), facies D (317-4), facies E (317-5), etc.

In the method described with reference to FIG. 2.1 above, measurement values in a well log, such as gamma ray, sonic or density logs, are clustered to identify electrofacies that are correlated with lithology of rocks surrounding the wellbore. FIGS. 3.2, 3.3, and 3.4 show an example of applying the method of FIG. 2.1 to the well log A (310) depicted in FIG. 3.1 above. In particular, FIG. 3.2 shows a portion of the well log A (310) (i.e., well log portion A (321)) where a change point A (323) is detected by processing the GR measurement values contained in the well log portion A (321). Specifically, the change point A (323) corresponds to a depth in the well log portion A (321) where the probability distribution of the GR measurement values changes. At the change point A (323), the probability distribution changes from the probability distribution A (324) to the probability distribution B (325). In particular, the probability distribution A (324) may include GR measurement values approximately between 75 and 100 while the probability distribution B (325) may include GR measurement values approximately between 25 and 40.

Further, FIG. 3.2 shows another portion of the well log A (310) (i.e., well log portion B (322)) with a coarser scale and divided into intervals, i.e., the interval A (320-1), interval B (320-2), interval C (320-3), interval D (320-4), interval E (320-5), interval F (320-6), interval G (320-7), and interval H (320-8). As described above, the intervals are defined by consecutive change points. For example, the interval B (320-2) is bounded and defined by the consecutive change points (326). In addition, statistics of GR measurement values within each interval bounded by the change points are generated, such as the statistic A (327), statistic B (328), and statistic C (329) of the interval B (320-2), interval C (320-3), and interval E (320-5), respectively. In particular, the statistic is denoted by a straight line superimposing the wiggly line that denotes the GR measurement values.

Continuing with the discussion of applying the method of FIG. 2.1 to the well log A (310), clustering is performed over the statistics of the intervals in the well log A (310). As shown in FIG. 3.2, the large number of measurements represented by the wiggly line in the well log portion B (322) is reduced to 8 distinct statistics for the 8 intervals. The method of FIG. 2.1 represents the well log A (310) as a substantially smaller number of statistics over which the clustering algorithm is applied to identify the electrofacies. In addition, in lieu of the large number of measurements in the well log, this smaller number of statistics are analyzed to generate an optimal cluster number as an input to the clustering algorithm FIG. 3.3 shows an example clustered scatter plot of the statistics of the intervals in the well log A (310). To perform the clustering and generate the clustered scatter plot, the well log A (310) is extended to further include a sequence of bulk density (DEN) measurement values. In other words, each measurement value in the extended well log is a vector value formed by a pair of a GR measurement value and a DEN measurement value that is obtained for the same depth. Clustering over the vector values is referred to as vector value clustering. The clustered scatter plot is a two dimensional plot of the statistics where the horizontal axis represents GR measurement values, and the vertical axis represents DEN measurement values. In one scenario, the change points, intervals defined by the change points, and the statistics of the intervals are based on the vector values contained in the extended well log. In another scenario, one set of the change points, intervals, and statistics is based on the GR measurements and a separate set of the change points, intervals, and statistics is based on the DEN measurements. These two sets of the change points, intervals, and statistics are then aggregated for performing the clustering. Generally, these two sets of the change points and intervals are substantially consistent to each other. Minor discrepancies are highlighted by the two ellipses (340) in the column D (331).

While the well log portion B (322) depicted in FIG. 3.2 includes 8 intervals having 8 statistics, many more intervals exist throughout the entirety of the well log A (310). The clustered scatter plot shown in FIG. 3.3 is based on a larger portion of the well log A (310). Accordingly, the clustered scatter plot contains many more statistics clustered into the cluster A, cluster B, cluster C, cluster D, and cluster E that are denoted according to the legend (340). Specifically, each data point icon in each of the clusters corresponds to a statistic of an interval. For example, the cluster B includes the statistic A (327) of the interval B (320-2) depicted in FIG. 3.2. Similarly, the cluster C includes the statistic B (328) of the interval C (320-3) and the statistic C (329) of the interval E (320-5) depicted in FIG. 3.2.

While the clustered scatter plot shown in FIG. 3.3 includes 4 clusters corresponding to a portion of the well log a (310), many more clusters exist throughout the entirety of the well log A (310). As noted above, prior to clustering the statistics of intervals of the well log A (310), among which the collection of data point icons is divided into the cluster A, cluster B, cluster C, and cluster D, an optimal cluster number is determined based on a pre-determined index. FIG. 3.4 shows an example plot of the KL index computed from 0 to 100 clusters for the statistics of all intervals of the well log A (310). Specifically, the KL index of the statistics of all intervals of the well log A (310) is computed as a function of possible number of clusters ranging from 0 through 100. The computed KL index is than analyzed to identify 13 as the optimal cluster number (350) for the entirety of the well log A (310). In particular, the KL index along the vertical axis of the example plot has a maximum value where the number of index equals 13 on the horizontal axis of the example plot. Using this optimal cluster number (i.e., 13) as an input to the K-means clustering algorithm, the statistics of all intervals of the well log A (310) are divided into 13 clusters. The clustered scatter plot depicted in FIG. 3.3 corresponds to a portion of the statistics of all intervals of the well log A (310). Accordingly, only 4 of the total 13 clusters are shown in the portion of the statistics of all intervals of the well log A (310).

Based on the cluster A, cluster B, cluster C, cluster D, and cluster E, the intervals of the well log A (310) are categorized into categorized intervals, as shown in FIG. 3.5 as highlighted segments in the column E (332).

FIG. 3.5 shows the same column A (311) and column B (312) as well as the additional column D (331) and column E (332). Specifically, the column D (331) shows the DEN log measurements (i.e., well log B (330)) that extends the well log A (310) for vector value clustering. The column E (332) shows the categorized intervals labeled by the corresponding clusters. For example, the interval A (320-1), interval B (320-2), interval C (320-3), interval D (320-4), interval E (320-5), and interval F (320-6) are respectively labeled by the cluster A, cluster B, cluster C, cluster D, cluster B, and cluster E where the respective intervals belong accordingly to the clustered scatter plot depicted in FIG. 3.3 above. Each of these categorized intervals is identified as an electrofacies that corresponds to a lithologically distinct rock layer. Specifically, the lithology of each electrofacies is indicated by the cluster where the electrofacies belongs. The electrofacies (i.e., categorized intervals) shown in the column E (332) are consistent with lithology. In other words, the method of FIG. 2.1 provides lithology consistent electrofacies.

Although the example shown in FIG. 3.5 is based on vector value clustering, the method of FIG. 2.1 may also be applied to scalar measurement values (i.e., well log A (310) without being extended by the well log B (330)) to generate lithology consistent electrofacies.

FIGS. 3.6 and 3.7 show an example in accordance with one or more embodiments. In one or more embodiments, the example shown in these figures may be practiced using the E&P computer system shown in FIGS. 1.1 and 1.2 and the method described with reference to FIG. 2.2 above. The following example is for example purposes and is not intended to limit the scope of the claims.

In the method described with reference to FIG. 2.2 above, measurement values in a well log, such as gamma ray, neutron, or bulk density measurements, are clustered to identify electrofacies that are correlated with lithology of rocks surrounding the wellbore. FIGS. 3.6 and 3.7 show an example of applying the method of FIG. 2.2 to a well log. In particular, FIG. 3.6 shows an example portion of a well log (i.e., well log portion (300)) that is analyzed to generate two clusters, i.e., cluster A (300-1) and cluster B (300-2). The well log includes a sequence of vector measurement values where the three components of each vector measurement value are identified according to column (521), column (522), and column (523), corresponding to gamma ray measurement, neutron measurement, and bulk density measurement, respectively. Specifically, the well log portion (300) includes seven measurements denoted as row (301), row (302), row (303), row (304), row (305), row (306), and row (307). Each row corresponds to a particular depth along the wellbore and includes the three types of measurements. While the vertical direction of the well log portion (300) corresponds to the depth along the wellbore, the horizontal direction corresponds to the measurement value within each of the column (521), column (522), and column (523). In particular, each measurement is denoted as a short vertical line segment within a row where the horizontal position of the short vertical line segment within the row denotes the corresponding measurement value. For example, the row (307) includes measurement A (521-1), measurement B (522-1), and measurement C (523-1), which correspond to the gamma ray measurement, neutron measurement, and bulk density measurement, respectively. TABLE 1 shows the normalized numerical values of each measurement in the well log portion (300).

TABLE 1

| GR (normalized) | NEU (normalized) | DEN (normalized) |
|---|---|---|
| .3 | .4 | .8 |
| .31 | .45 | .7 |
| .6 | .15 | .04 |
| .65 | .2 | .35 |
| .3 | .42 | .75 |
| .33 | .49 | .68 |
| .64 | .22 | .41 |

In the example shown in FIG. 3.6, an unsupervised segmentation algorithm, Spectral Clustering, is used to cluster the measurements of the well log portion (300). Spectral Clustering takes into consideration the spatial arrangement of the measurements in the well log portion (300) by building an un-oriented weighted graph of connected nodes, such as the graph (515). In the graph (515), the nodes correspond to the measurements while the lengths of edges correspond to affinity indexes of node pairs. In particular, a shorter length of an edge corresponds to a larger affinity index or closer relationship between the corresponding pair of nodes. In contrast, a longer length of an edge corresponds to a smaller affinity index or more distant relationship between the corresponding pair of nodes. For example, the nodes (301-1), (302-1), (303-1), (304-1), (305-1), (306-1), and (307-1) represent the measurements denoted by the row (301), row (302), row (303), row (304), row (305), row (306), and row (307), respectively. Accordingly, the length of the edge A (301-2) corresponds to the affinity index between the measurements denoted by the row (301) and row (302). Similarly, the length of the edge B (301-3) corresponds to the affinity index between the measurements denoted by the row (301) and row (305), and so on and so forth. The graph (515) is then partitioned according to spectral analysis of a Laplacian matrix of the graph (515). An example mathematical model used for calculating the affinity indexes and performing the clustering operation is described below.

Given a sequence $S=\{x_1, \ldots, x_n\}$ of n measurements in a well log where $x_i$ represents a vector of multiple dimensions, the similarity measure between two measurements $x_i$ and $x_j$ is denoted as $\tilde{A}_{ij}$ in the equation below where σ is a pre-determined mathematical decay constant.

$$\tilde{A}_{ij} = \frac{e^{-\|x_i - x_j\|^2}}{2\sigma^2} \qquad \text{Eq. 6}$$

In addition, the proximity measure between two measurements $x_i$ and $x_j$ is denoted as $C_{ij}$ in the equation below where w is a pre-determined mathematical range constant.

$$C_{ij} = \begin{cases} 1 & \text{if } 0 < |i-j| <= W \\ 0 & \text{otherwise} \end{cases} \qquad \text{Eq. 7}$$

Accordingly, the affinity index between the two measurements $x_i$ and $x_j$ is defined as $A_{ij}$ in the equation below.

$$A_{ij} = \tilde{A}_{ij} + C_{ij} \qquad \text{Eq. 8}$$

The affinity indexes for the seven measurements of the well log portion (300) are listed in TABLE 2 below using a matrix format where $A_{ij}$ is listed in the $i^{th}$ row and $j^{th}$ column of the affinity matrix $A \in \mathbb{R}^{n \times n}$ with n=7. In particular, $S=\{x_1, x_2, x_3, x_4, x_5, x_6, x_7\}$ corresponds to the measurements denoted as row (301), row (302), row (303), row (304), row (305), row (306), and row (307). As an example, the length of each edge in the graph (515) is proportional to a corresponding affinity index. For example, the length of the edge A (301-2) is inversely proportional to the affinity index $A_{12}$ (i.e., 1) between the pair of measurements row (301) and row (302). Similarly, the length of the edge B (301-3) is inversely proportional to the affinity index $A_{15}$ (i.e., 0.99) between the pair of measurements row (301) and row (305), and so on and so forth. In TABLE 2, several matrix elements $A_{ij}$ (e.g., $A_{13}$) are set to 0 based on corresponding affinity indexes having values less than a threshold. The corresponding edges would then have lengths of infinity. Accordingly, the corresponding node pairs are not connected in the graph (515). For example, the node pairs (523-1) and (305-1) are not connected (i.e., having an edge length of infinity) because the corresponding affinity index $A_{13}$ is set to 0.

TABLE 2

| 1 | 1 | 0 | 0 | 0.99 | 0 | 0 |
|---|---|---|---|---|---|---|
| 1 | 1 | 1 | 0 | 0 | 0.97 | 0 |
| 0 | 1 | 1 | 1 | 0 | 0 | 0.74 |
| 0 | 0 | 1 | 1 | 1 | 0 | 0.74 |
| 0.99 | 0 | 0 | 1 | 1 | 1 | 0 |
| 0 | 0.7 | 0 | 0 | 1 | 1 | 1 |
| 0 | 0 | .74 | .74 | 0 | 1 | 1 |

In the mathematical model for performing the cluster operation, the sequence of measurements S in a well log is represented as the weighted graph (e.g., graph (515)) where the edge lengths are weighted inversely proportional to the affinity indexes in the affinity matrix A. The Laplacian matrix L of the weighted graph is given by the equation below where D is the diagonal matrix with the sum of A's $i^{th}$ row as each diagonal element $d_i$.

$$d_i = \sum_j A_{ij} \quad \text{Eq. 9}$$

$$L = Id - D^{-\frac{1}{2}} * A * D^{-\frac{1}{2}}$$

$$L_{ij} = \begin{cases} 1 - \dfrac{A_{ij}}{\sqrt{d_j} * \sqrt{d_i}} & \text{if } i = j \\ -\dfrac{A_{ij}}{\sqrt{d_j} * \sqrt{d_i}} & \text{if } i \neq j \end{cases}$$

Eq. 9 may also be written in the matrix form $$L = D^{-\frac{1}{2}} * A * D^{-\frac{1}{2}}.$$

The Spectral Clustering algorithm is used to generate a Y-matrix $Y \in \mathbb{R}^{n \times (k-1)}$ having k−1 columns that are the first k−1 eigen-vectors of L denoted as $[e_1 \ldots e_{k-1}]$. The eigen vectors correspond to the k−1 lowest eigen values of L. In particular, each row of the Y-matrix corresponds to a measurement in the well log, and k is a user selected integer to divide the measurements in the well log into k clusters. Each row of Y is used as an input to the K-Mean algorithm to generate the k clusters. Accordingly, each measurement $x_i$ in the well log is assigned to the cluster where the corresponding row i of the Y-matrix belongs.

Returning to the discussion of the example well log portion (300) depicted in FIG. 3.6, the numerical values of the measurements (i.e., row (301) through row (307)) in the well log portion (300) are listed in the measurements table (300-1) consistent with the TABLE 1 above. Based on the value k=2, the resultant single column Y-matrix is shown as the Y-matrix (300-2). The measurements (i.e., row (301) through row (307)) in the well log portion (300) are then clustered by applying the K-Mean algorithm to the unit-length rows of the Y-matrix (300-2). Specifically, the $1^{st}$, $2^{nd}$, $5^{th}$, and $6^{th}$ rows of the Y-matrix (300-2) are clustered into one cluster while the $3^{rd}$, $4^{th}$, and $7^{th}$ rows of the Y-matrix (300-2) are clustered into another cluster. Accordingly, the nodes (301-1), (302-1), (305-1), and (306-1) are clustered into the cluster A (300-1) and the nodes (303-1), (304-1), and (307-1) are clustered into the cluster B (300-2). As a result, the well log portion (300) are segmented into four intervals, namely, the interval X (520-1) having the row (301) and row (302), the interval Y (520-2) having the row (303) and row (304), the interval Z (520-3) having the row (305) and row (306), and the interval W (520-4) having the row (307). As described above, each of the interval X (520-1), interval Y (520-2), interval Z (520-3), and interval W (520-4) is referred to as an electrofacies.

Although the example described above relates to a particular number of measurements and particular number of clusters, any number of measurements in a well log may be analyzed using the method described with reference to FIG. 2.2 above to generate any number of clusters.

FIG. 3.7 shows an example of a well log (510) that is analyzed to generate well log intervals using the method described with reference to FIG. 2.2 above. Specifically, the well log (510) is shown in the column A1 (511) where the wiggly curve (515) represents a sequence of bulk density log measurements, the wiggly curve (516) represents a sequence of neutron log measurements, and the wiggly curve (517) represents a sequence of gamma ray log measurements. Due to a large number of measurements in each of the three wiggly curves, each measurement in the well log (510) is not individually visible as the rows (501) through (507) depicted in FIG. 3.6. The column B1 (512) shows the well log intervals (i.e., interval A1 (521-1), interval B1 (521-2), interval C1 (521-3), interval D1 (521-4), interval E1 (521-5), interval F1 (521-6), interval G1 (521-7), and interval H1 (521-8)) that are generated from the well log (510) using the Spectral Clustering algorithm described above. Each well log interval is highlighted and distinguishable from adjacent intervals. Intervals belonging to the same cluster are highlighted the same way. In particular, the interval A1 (521-1) belongs to a first cluster; the interval B1 (521-2) belongs to a second cluster; the interval C1 (521-3), interval E1 (521-5), and interval G1 (521-7) belong to a third cluster; and the interval D1 (521-4), interval F1 (521-6), and interval H1 (521-8) belong to a fourth cluster. Each interval is identified as an electrofacies that corresponds to a lithologically distinct rock layer. Specifically, the lithology of each electrofacies is indicated by the cluster where the electrofacies belongs. For example, the three rock layers corresponding to the interval C1 (521-3), interval E1 (521-5), and interval G1 (521-7) in the third cluster share a common lithology. Similarly, another three rock layers corresponding to the interval D1 (521-4), interval F1 (521-6), and interval H1 (521-8) in the fourth cluster share another common lithology.

Although the examples shown in FIGS. 3.6 and 3.7 are based on vector value clustering, the method of FIG. 2.2 may also be applied to scalar measurement values (i.e., based on a single type of log measurement) to generate lithology consistent electrofacies.

Embodiments may be implemented on a computing system. Any combination of mobile, desktop, server, router, switch, embedded device, or other types of hardware may be used. For example, as shown in FIG. 4.1, the computing system (400) may include one or more computer processor(s) (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), and a communication interface (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device.

The communication interface (412) may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (402), memory (404), and storage device(s) (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform one or more embodiments.

The computing system (400) in FIG. 4.1 may be connected to or a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform at least a portion of one or more embodiments.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited only by the attached claims.

What is claimed is:

1. A method for managing a field, comprising:

obtaining, using a processor, a well log comprising a sequence of measurements of a wellbore in the field, the measurements in the sequence each representing a characteristic of surrounding rock and corresponding to a depth along the wellbore;

generating, using the processor, a plurality of change points in the well log based on the sequence of measurements, the plurality of change points each corresponding to a change of a probability distribution of measurement values of the wellbore;

generating, using the processor, a statistic for each of a plurality of intervals in the well log, wherein the plurality of intervals is defined by the plurality of change points;

analyzing, using the processor, the statistic for each of the plurality of intervals to generate an optimal cluster number;

categorizing, using the processor, the plurality of intervals based on the statistic for each of the plurality of intervals to generate a plurality of categorized intervals;

dividing, using the processor and a pre-determined clustering algorithm, the statistic for each of the plurality of intervals into a plurality of clusters based on the optimal cluster number, the plurality of clusters each corresponding to one of a plurality of categories, and the plurality of intervals each being categorized into one of the plurality of categorized intervals based on the plurality of categories;

generating, using the processor, one or more electrofacies based on the plurality of categorized intervals; and generating, using the processor, a control operation for facilitating a field operation based on the one or more electrofacies.

2. The method of claim 1, further comprising:

generating a plurality of affinity indexes corresponding to a plurality of pairs of measurements in the sequence, the plurality of affinity indexes comprising an affinity index for a pair of measurements in the sequence, the pair being in the plurality of pairs, and the affinity index for the pair being based on a similarity measure of the pair and a proximity measure of two corresponding depths of the pair;

generating, according to a pre-determined clustering algorithm based on the plurality of affinity indexes, a plurality of clusters of the measurements in the sequence; and performing the operation further based on the plurality of clusters of the measurements.

3. The method of claim 1, further comprising:

analyzing, according to a pre-determined change point detection algorithm, the sequence of measurements to generate the plurality of change points.

4. The method of claim 3, wherein the pre-determined change point detection algorithm comprises a plurality of binary segmentations each preformed on an iteratively segmented portion of the sequence of measurements.

5. The method of claim 1, further comprising:

obtaining two consecutive change points from the plurality of change points; and generating an interval of the plurality of intervals that is bounded by the two consecutive change points.

6. The method of claim 1, wherein analyzing the statistic for each of the plurality of intervals includes maximizing a pre-determined index of the statistic for each of the plurality of intervals.

7. The method of claim 6, further comprising:

identifying, based on the electrofacies, a plurality of lithologically distinct layers of the field that are penetrated by the wellbore, wherein performing the operation is further based on the plurality of lithologically distinct layers.

8. A system for managing a field, comprising:
a computer processor;
memory storing instructions executed by the computer processor, wherein the instructions comprise:
  an input receiver configured to:
    obtain a well log comprising a sequence of measurements of a wellbore in the field, the measurements in the sequence each of measurement values corresponding to a depth along the wellbore,
  a change point detector configured to:
    generate a plurality of change points in the well log based on the sequence of measurements, the plurality of change points each corresponding to a change of a probability distribution of measurement values of the wellbore, and
  an electrofacies generator configured to:
    generate a statistic for each of a plurality of intervals in the well log, wherein the plurality of intervals is defined by the plurality of change points,
    analyze the statistic for each of the plurality of intervals to generate an optimal cluster number;
    categorize the plurality of intervals based on the statistic for each of the plurality of intervals to generate a plurality of categorized intervals;
    divide, using a pre-determined clustering algorithm, the statistic for each of the plurality of intervals into a plurality of clusters based on the optimal cluster number, the plurality of clusters each corresponding to one of a plurality of categories, and the plurality of intervals each being categorized into one of the plurality of categorized intervals based on the plurality of categories;
    generate one or more electrofacies based on the plurality of categorized intervals; and
  a field task engine configured to:
    generate a control operation for facilitating a field operation based on the one or more electrofacies; and
  a repository for storing the well log, the plurality of change points, the one or more electrofacies, and the plurality of categorized intervals.

9. The system of claim 8, wherein the memory, computer processor and repository are part of an exploration and production (E&P) computer system, and wherein the system further comprises:
  a field equipment coupled to the E&P computer system and configured to perform a field operation based on the plurality of categorized intervals, wherein the computer operation is the field operation.

10. The system of claim 8,
wherein the instructions further comprise an affinity index generator configured to:
  generate a plurality of affinity indexes corresponding to a plurality of pairs of measurements in the sequence, the plurality of affinity indexes comprising an affinity index for a pair of measurements in the sequence, the pair being in the plurality of pairs, and the affinity index for the pair being based on a similarity measure of the pair and a proximity measure of two corresponding depths of the pair, and
wherein the electrofacies generator is further configured to:
  generate, according to a pre-determined clustering algorithm based on the plurality of affinity indexes, a plurality of clusters of the measurements in the sequence.

11. The system of claim 9, further comprising:
the field equipment configured to perform a first logging and a second logging of the wellbore to generate the sequence of measurements in the well log, the measurements in the sequence each comprising a first measurement from the first logging and a second measurement from the second logging, and
wherein an affinity index generator is further configured to:
  generate a first similarity measure of the pair based on the first measurement of each of the pair;
  generate a second similarity measure of the pair based on the second measurement of each of the pair; and
  aggregate the first similarity measure and the second similarity measure to generate a similarity measure of the pair.

12. The system of claim 10, wherein the affinity index generator is further configured to:
  identify a vector space of the sequence of measurements, wherein the vector space comprises a plurality of vectors based on the first measurement and the second measurement of each measurement in the sequence; and
  compute a Euclidean distance between the pair in the vector space, wherein the similarity measure is based on the Euclidean distance,
wherein the affinity index is proportional to the similarity measure and the proximity measure.

13. The system of claim 9, wherein the electrofacies generator is further configured to:
  identify, based on the plurality of clusters, another plurality of intervals in the well log,
  wherein each of the plurality of clusters comprises one or more intervals of the another plurality of intervals in the well log, and
  wherein each of the another plurality of intervals comprises a set of consecutive measurements in the sequence and corresponds to a segment of the wellbore.

14. The system of claim 13, wherein the electrofacies generator is further configured to:
  identify, based on the electrofacies, a plurality of lithologically distinct layers of the field that are penetrated by the wellbore.

15. A non-transitory computer readable storage medium storing instructions to carry out the method according to any of claims 1-7.

* * * * *